United States Patent
Johnson et al.

(10) Patent No.: US 12,019,169 B2
(45) Date of Patent: Jun. 25, 2024

(54) SYSTEMS AND METHODS FOR MONITORING NAVIGATIONAL SYSTEMS

(71) Applicant: Honeywell International Inc., Charlotte, NC (US)

(72) Inventors: Bruce Johnson, Coon Rapids, MN (US); Daniel Bertrand, Coon Rapids, MN (US); James McDonald, Coon Rapids, MN (US)

(73) Assignee: Honeywell International Inc., Charlotte, NC (US)

( * ) Notice: Subject to any disclaimer, the term of this patent is extended or adjusted under 35 U.S.C. 154(b) by 246 days.

(21) Appl. No.: 17/445,524

(22) Filed: Aug. 20, 2021

(65) Prior Publication Data
US 2022/0120914 A1 Apr. 21, 2022

Related U.S. Application Data (60) Provisional application No. 63/073,677, filed on Sep. 2, 2020.

(51) Int. Cl.
*G01S 19/24* (2010.01)
*B64C 39/02* (2023.01)
(Continued)

(52) U.S. Cl.
CPC .......... *G01S 19/243* (2013.01); *B64C 39/024* (2013.01); *G01S 19/14* (2013.01); *G01S 19/23* (2013.01); *B64U 2101/00* (2023.01)

(58) Field of Classification Search
CPC ........ G01S 19/243; G01S 19/14; G01S 19/23; G01S 19/21; G01S 19/03; B64C 39/024;
(Continued)

(56) References Cited

U.S. PATENT DOCUMENTS

| 7,783,246 B2 | 8/2010 | Twitchell, Jr. et al. |
| 9,164,515 B1 | 10/2015 | Huebner et al. |

(Continued)

FOREIGN PATENT DOCUMENTS

| CA | 3012499 A1 * | 2/2019 | ............ G01S 19/22 |
| KR | 102056698 B1 | 12/2019 | |
| WO | 2021038485 A1 | 3/2021 | |

OTHER PUBLICATIONS

Nathan Strout "NATO's new tool shows impact of GPS jammers", Electronic Warfare, Apr. 15, 2020, (6 pages).
(Continued)

*Primary Examiner* — Jean B Corrielus
(74) *Attorney, Agent, or Firm* — Alston & Bird LLP (57) ABSTRACT

A computer-implemented method for analyzing GNSS coverage may comprise: receiving data from at least one of a GNSS interference detector or a GNSS almanac; correlating the data received from the at least one of the GNSS interference detector or the GNSS almanac using data regarding a structure of a GNSS interference detector network; using the correlated data, determining whether a loss of availability of a relevant GNSS exists; and upon determining that the relevant GNSS loss of availability exists, performing at least one of (a) providing a notification regarding the loss of availability and a geographic region impacted, (b) providing rerouting information, (c) automatically rerouting a vehicle, (d) permitting operation in regions of GNSS loss of availability under VFR rules, or (e) providing information regarding a geographic region impacted.

19 Claims, 4 Drawing Sheets

(51) Int. Cl.
  *G01S 19/14*  (2010.01)
  *G01S 19/23*  (2010.01)
  *B64U 101/00* (2023.01)

(58) Field of Classification Search
  CPC ............ B64U 2101/00; G05D 1/0055; G05D 1/0278; G08G 5/0013; G08G 5/0021; G08G 5/0039; G08G 5/0056
  See application file for complete search history.

(56) References Cited

U.S. PATENT DOCUMENTS

| | | | |
|---|---|---|---|
| 9,466,881 B1* | 10/2016 | Berry | G01C 21/20 |
| 10,073,179 B2 | 9/2018 | Driscoll et al. | |
| 10,254,411 B2 | 4/2019 | Littlefield et al. | |
| 11,137,499 B2* | 10/2021 | Meng | H04K 3/90 |
| 11,194,052 B1* | 12/2021 | Kazmierczak | G01S 19/215 |
| 2006/0023655 A1 | 2/2006 | Engel et al. | |
| 2013/0310068 A1 | 11/2013 | Fischer et al. | |
| 2017/0070971 A1 | 3/2017 | Wietfeldt et al. | |
| 2023/0017616 A1* | 1/2023 | Wang | H04K 3/65 |

OTHER PUBLICATIONS

European search report dated May 30, 2022 for EP Application No. 21193669, 14 page(s).
Supplementary European search report dated Feb. 23, 2022 for EP Application No. 21193669, 14 page(s).
Michael Grace et al., "An Automated Tool for Mission Planning in GPS-Denied Areas," U.S. Navy Space and Naval Warfare Systems Command, 6 pages (2006).

* cited by examiner

SYSTEMS AND METHODS FOR MONITORING NAVIGATIONAL SYSTEMS

CROSS REFERENCE TO RELATED APPLICATION(S)

The present application claims the benefit of priority to U.S. Provisional Patent Application No. 63/073,677, entitled "SYSTEMS AND METHODS FOR MONITORING NAVIGATIONAL SYSTEMS," which was filed on Sep. 2, 2020, the disclosure of which is incorporated herein by reference in its entirety.

TECHNICAL FIELD

Various embodiments of the present disclosure generally relate to systems and methods for monitoring navigational systems, and, more particularly, relate to systems and methods for monitoring any Global Navigation Satellite System (GNSS).

BACKGROUND

Commercial aircraft utilize GNSS as their primary navigation source due to its accuracy and ease of use. In case of a loss of availability of the GNSS system, aircraft are equipped with multiple backup systems, including radio navigation aids and navigation grade inertial systems. However, these backup systems are complex, large, and heavy. Therefore, it is desirable to address these drawbacks to backup systems.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF DISCLOSURE

According to certain aspects of the disclosure, systems and methods are disclosed to monitor GNSS networks.

According to certain aspects of the disclosure, a computer-implemented method for analyzing GNSS coverage may comprise: receiving data from at least one of a GNSS interference detector or a GNSS almanac; correlating the data received from the at least one of the GNSS interference detector or the GNSS almanac using data regarding a structure of a GNSS interference detector network; using the correlated data, determining whether a loss of availability of a relevant GNSS exists; and upon determining that the relevant GNSS loss of availability exists, performing at least one of (a) providing a notification regarding the loss of availability, (b) providing rerouting information, (c) automatically rerouting a vehicle, (d) permitting operation in regions of GNSS loss of availability under VFR rules, or (e) providing information regarding a geographic region impacted.

According to certain aspects of the disclosure, a computer-implemented method for analyzing GNSS coverage comprises: receiving GNSS almanac data and masking data regarding a visible GNSS network; using the received GNSS almanac data and the received masking data, predicting whether the visible GNSS network will support operations of a vehicle within a geographic region defined by a route structure; upon predicting that the visible GNSS network will not support the operations of the vehicle at a location within the geographic region, performing at least one of (a) providing a notification regarding a loss of availability, (b) providing rerouting information, (c) automatically rerouting a vehicle, (d) permitting operation in regions of GNSS loss of availability under VFR rules, or (e) providing a notification of an area having a loss of availability.

According to certain aspects of the disclosure, a system for analyzing GNSS availability may comprise: a source of almanac data; a source of masking data; and a computer having a processor configured to: receive GNSS almanac data and masking data regarding a visible GNSS network; use the received GNSS almanac data and the received masking data, predicting whether the visible GNSS network will support operations of a vehicle within a geographic region defined by a route structure; upon predicting that the visible GNSS network will not support the operations of the vehicle at a location within the geographic region, perform at least one of (a) providing a notification regarding a loss of availability, (b) providing rerouting information, (c) automatically rerouting a vehicle, (d) permitting operation in regions of GNSS loss of availability under VFR rules, or (e) providing a notification of an area having a loss of availability.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

GNSS outages or loss of availability may result from factors such as aircraft equipment faults, GNSS signal blockage(s), poor constellation, GNSS jammers or other GNSS interference source(s). A use of the term "jammer" herein will be understood to incorporate various GNSS interference sources/signal interfering devices. Because commercial aircraft are equipped with multiple backup systems, including radio navigation aids and navigation grade inertial systems, a loss of GNSS availability (e.g., an outage) is, at worst, a nuisance. Where outages are referred to herein, it will be appreciated that the disclosure also encompasses other forms of loss of GNSS availability. However, such backup systems may be impractical or otherwise undesirable for use with Unmanned Aerial Vehicles (UAV) and Urban Air Mobility (UAM) vehicles. Although UAM vehicles may be referenced below, it will be appreciated that the disclosed aspects also apply to UAVs and, thus, the disclosure encompasses systems and methods for UAVs. For example, UAM vehicles may have reduced size, weight, and/or complexity allowance for their avionics systems. But UAM vehicles may still require equivalent levels of operational safety comparable to those of commercial aircraft having multiple backup systems. Therefore, it is desirable to limit the use of and need for backup systems to provide support in cases of loss of GNSS availability.

The present disclosure provides systems and methods for providing predicted and actual (e.g., real-time) GNSS availability information along specific flight paths. For example, GNSS availability information may be provided to UAV/UAM fleet operations centers to facilitate route planning and scheduling. The availability/loss of availability information may also be provided to a UAM vehicle crew during preflight planning to, for example, allow possible rerouting. The outage information may also be provided to an en-route UAM vehicle crew to, for example, allow mitigation of a GNSS loss of availability (e.g., a reroute of the vehicle or use of visual flight rule ("VFR") operations).

Such a system may support a reduced a-priori probability of a vehicle GNSS loss of availability and therefore permit a commensurate reduction in complexity of the vehicle's navigation system in terms of backups required to support these outages. A reduction in backup systems required to support operation in environments without GNSS may reduce vehicle costs and weight.

Figure 1:
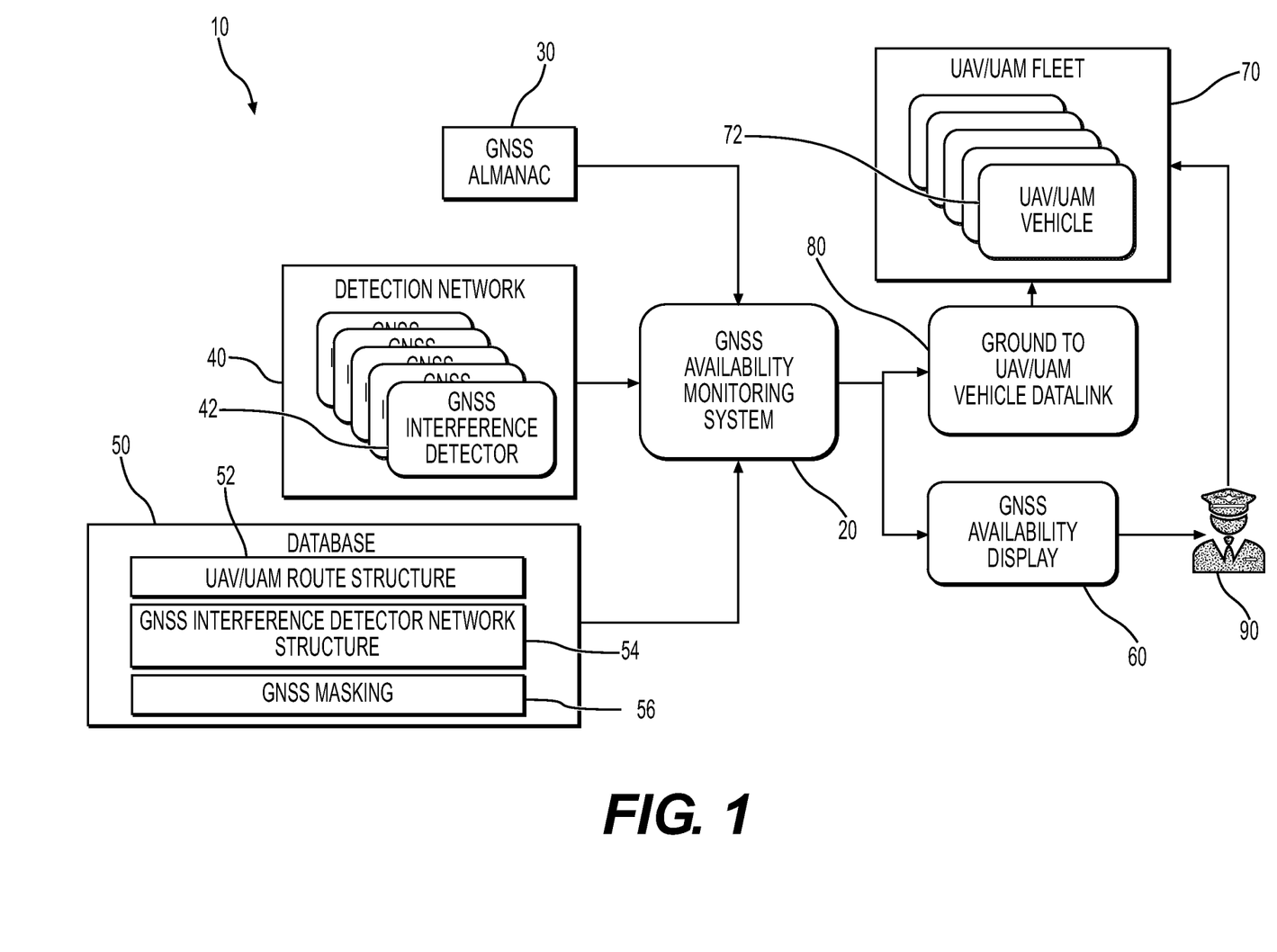
FIG. 1 depicts a system for analyzing navigation networks.

Turning to the appended figures, FIG. 1 depicts an exemplary system 10 for providing GNSS availability data (e.g., outage data), including those that are predicted or detected, to UAV/UAM vehicles in communication with the system. As shown in FIG. 1, system 10 may include a GNSS almanac 30, an interference detection network 40, and a database 50, all disposed in communication with a GNSS availability monitoring system 20. GNSS availability monitoring system 20 may also be in communication with a Ground-to-UAV/UAM vehicle datalink 80 and a GNSS availability display 60 disposed in communication with one or more UAV/UAM vehicles 72 of a UAV/UAM fleet 70. Thus, GNSS availability monitoring system 20 may be configured to receive data from a GNSS almanac 30, interference detection network 40, and/or database 50, perform analysis on this data, and/or provide GNSS availability data (e.g., by geographic location) to one or more UAV/UAM vehicles 72 of a UAV/UAM fleet 70 via one or both of the UAV/UAM vehicle datalink 80 or availability display 60.

GNSS almanac 30 consists of a regularly updated data set that defines GNSS satellite orbital parameters for all or a subset of active satellites within a GNSS constellation. GNSS almanac 30 may include data for one or more GNSS constellations. GNSS almanac may draw from one or more sources, including, for example, a GNSS receiver or the internet (e.g., an internet website).

Interference detection network 40 may include one or more (e.g., a plurality) of GNSS interference detectors 42 (e.g., jammers). Interference detectors 42 may form a network. The network may cover routes (including, e.g., standard and/or emergency routes) that may be flown by a fleet of UAV/UAM vehicles. For example, the network may include all possible routes. Alternatively, the network may include only a subset of routes. Each interference detector 42 may provide data (e.g., a set of data) identifying the presence and/or characteristic(s) of any detected GNSS interference source. For example, at a minimum, interference detector 42 may detect a presence of a GNSS interference source. Interference detector 42 may also detect characteristics including power level and bearing of an interference signal from a GNSS interference source (e.g., relative to interference detector 42). Each of a plurality of interference detectors 42 of interference detection network 40 may have the same properties/configuration, or interference detectors 42 may have different characteristics from one another. For example, different interference detectors 42 may detect GNSS interference detectors in different regions. Interference detectors 42 may detect the same or varying characteristics of a GNSS interference source. For example, different interference detectors 42 may be configured to detect different types of GNSS interference. Interference detectors 42 may be located at different locations in order to detect GNSS interference sources in different areas/regions.

Database 50 may include various data, which may be stored in the same location or in different locations/databases/elements. Although different databases are described below, it will be appreciated that alternative data structures may be used. For example, database 50 may include a UAV/UAM Route Structure database 52. UAV/UAM Route Structure database 52 may identify all possible standard routes between vertiports (or other types of stations, stops, etc.) within the UAV/UAM network. UAV/UAM Route Structure database 52 may also include emergency routing information regarding actions/paths that may be initiated by a vehicle traveling anywhere along a standard route, to an emergency landing site.

Database 50 may also include a GNSS interference detector network structure database 54. GNSS interference detector network structure database 54 may identify a physical location of each GNSS interference detector 42 within interference detection network 40.

Database 50 may also include a GNSS masking database 56. GNSS masking database 56 may identify azimuth/elevation masks that exist along standard and/or emergency routes.

Database 50 may also include additional or alternative databases. The data stored in database 50 may be stored in any suitable combination of tables or other database structures and may be combined in different manners than the databases described above.

GNSS availability monitoring system 20 may process some or all the above input data sources (GNSS almanac 30, interference detection network 40, and/or database 50) in order to identify locations where GNSS is not available. GNSS availability monitoring system 20 may provide notification of outage locations to one or both of (a) an availability display 60 and/or (b) one or more UAV/UAM vehicle(s) 72 of a UAV/UAM fleet 70. Communication with UAV/UAM vehicle 72 may be via a ground to UAV/UAM vehicle datalink 80.

Availability display 60 may provide a real-time tool for pre-flight route planning and flight diversions. Availability display 60 may be accessed by a user 90, including, for example, a pilot, a traffic controller, an administrator, a party planning a flight, or any other suitable party. Availability display 60 may be located remotely or locally to the GNSS availability monitoring system 20 and/or the ground to UAV/UAM vehicle datalink 80. For example, availability display 60 may be located on the ground or in the air.

One or more UAV/UAM vehicles 72 may comprise a UAV/UAM fleet 70. UAV/UAM fleet 70 may be managed by a single user 90 or by multiple users 90. UAV/UAM fleet 70 may utilize the same GNSS availability monitoring system 20, or components of GNSS availability monitoring system 20 may vary across different vehicles of system 10.

Ground-to-UAV/UAM vehicle datalink 80 may include a multi-use data link that may be used to uplink GNSS availability data from GNSS availability monitoring system 20 to UAV/UAM vehicle 72, which may be in flight. Ground-to-UAV/UAM vehicle datalink 80 may be a two-way link that may be used to communicate route changes, whether initiated by the ground segment or a pilot/vehicle of UAV/UAM vehicle 72. Ground-to-UAV/UAM vehicle datalink 80 may also be in communication with user 90, relaying information obtained from the GNSS availability display 60.

For example, ground-to-UAV/UAM vehicle datalink 80 may be in communication with GNSS availability display 60.

System 10 may provide GNSS availability data in order to minimize or otherwise decrease a risk of UAV/UAM vehicle 72 flying into an area without GNSS availability (e.g., information that GNSS availability is not sufficient to support positioning needs, such as a GNSS denied area). One or more of the following techniques may be utilized. In particular, system 10 of FIG. 1 may be configured to perform one or more of the methods described below in relation to FIGS. 2 and 3.

Figure 2:
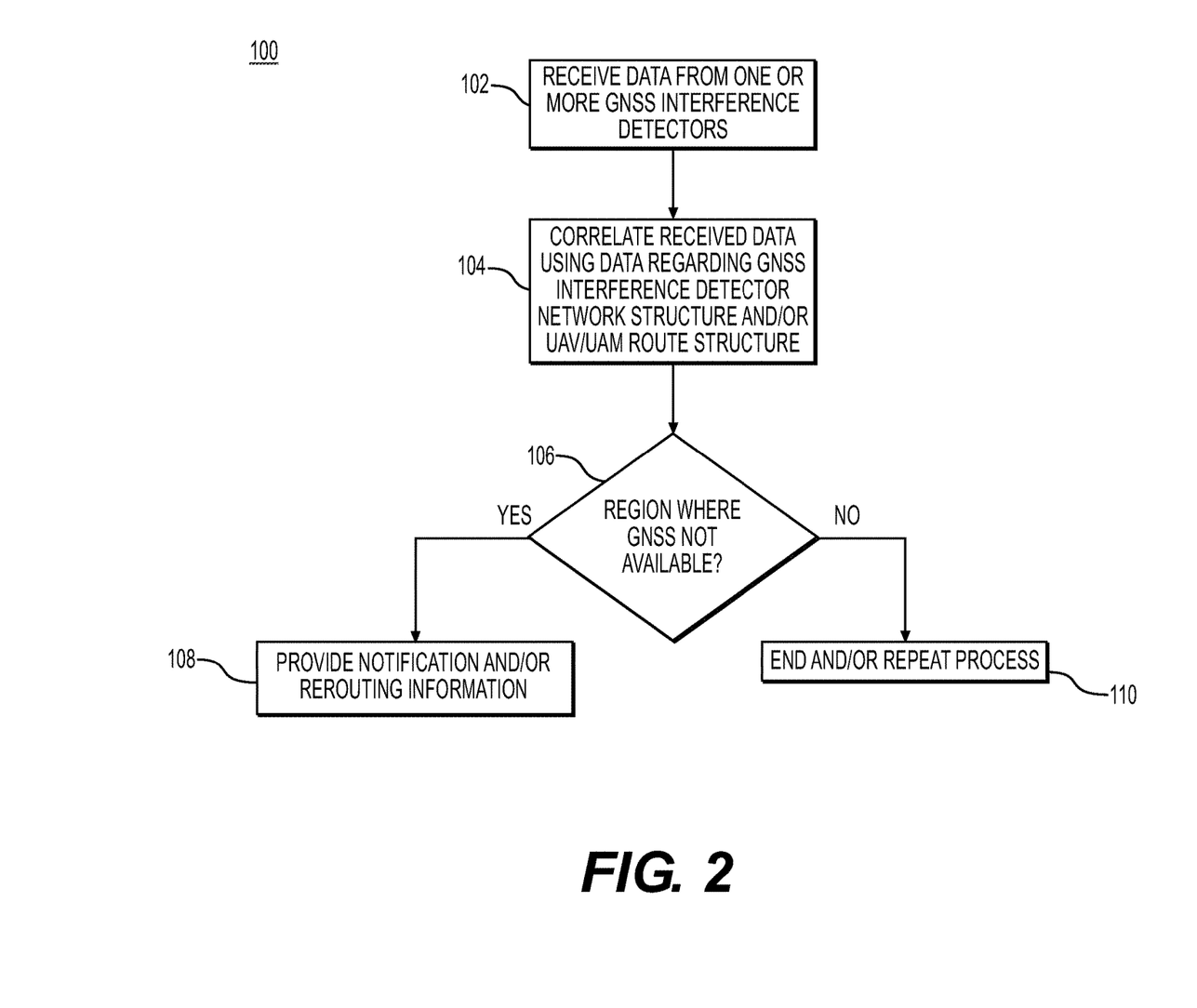
FIGS. 2-3 depict flow charts of exemplary methods for using the system of FIG. 1.

As shown in FIG. 2, a method 100 may perform real-time monitoring to identify regions where GNSS is not available for UAV/UAM vehicles 72 that are currently in flight (or for UAV/UAM vehicles 72 preparing for a flight). In step 102, GNSS interference monitoring system 20 may receive data from interference detection network 40, including one or more GNSS interference detectors 42. In step 104, GNSS availability monitoring system 20 may correlate data from interference detection network 40 (including GNSS interference detectors 42) using, for example, GNSS interference detector network structure database 54, allowing identification of regions along routes, defined by UAV/UAM route structure database 52, where GNSS availability is not present and/or identify alternate route(s). A level of accuracy may be dependent on the specific data received. For example, if only the presence of a GNSS interference source is known, low fidelity may be possible. If power and bearing to the GNSS interference source is also provided by interference detection network 40 or otherwise known, then a higher fidelity model of the impacted region may be made. GNSS availability monitoring system 20 may also use information from GNSS almanac 30, GNSS masking database 56, and/or UAM route structure database 52 in order to identify alternative routes. In step 106, GNSS availability monitoring system 20 may determine whether a loss of GNSS availability is affecting any geographic region within the UAV/UAM route structure as defined by database 52. In step 108, if there is a loss of availability, a notification may be provided (e.g., directly to UAM vehicle 72 or to personnel via, for example, the GNSS availability display 60. Additionally or alternatively, system 10 may provide rerouting information (using, e.g., data from UAV/UAM route structure database 52) and/or automatically reroute UAV/UAM vehicle 72. Additionally or alternatively, in lieu of rerouting, a UAV/UAM may elect or may be instructed to continue the route with the intent of operating under visual flight rules (VFR). If there is no outage determined in step 106, then method 100 may be terminated or repeated in step 110.

Figure 3:
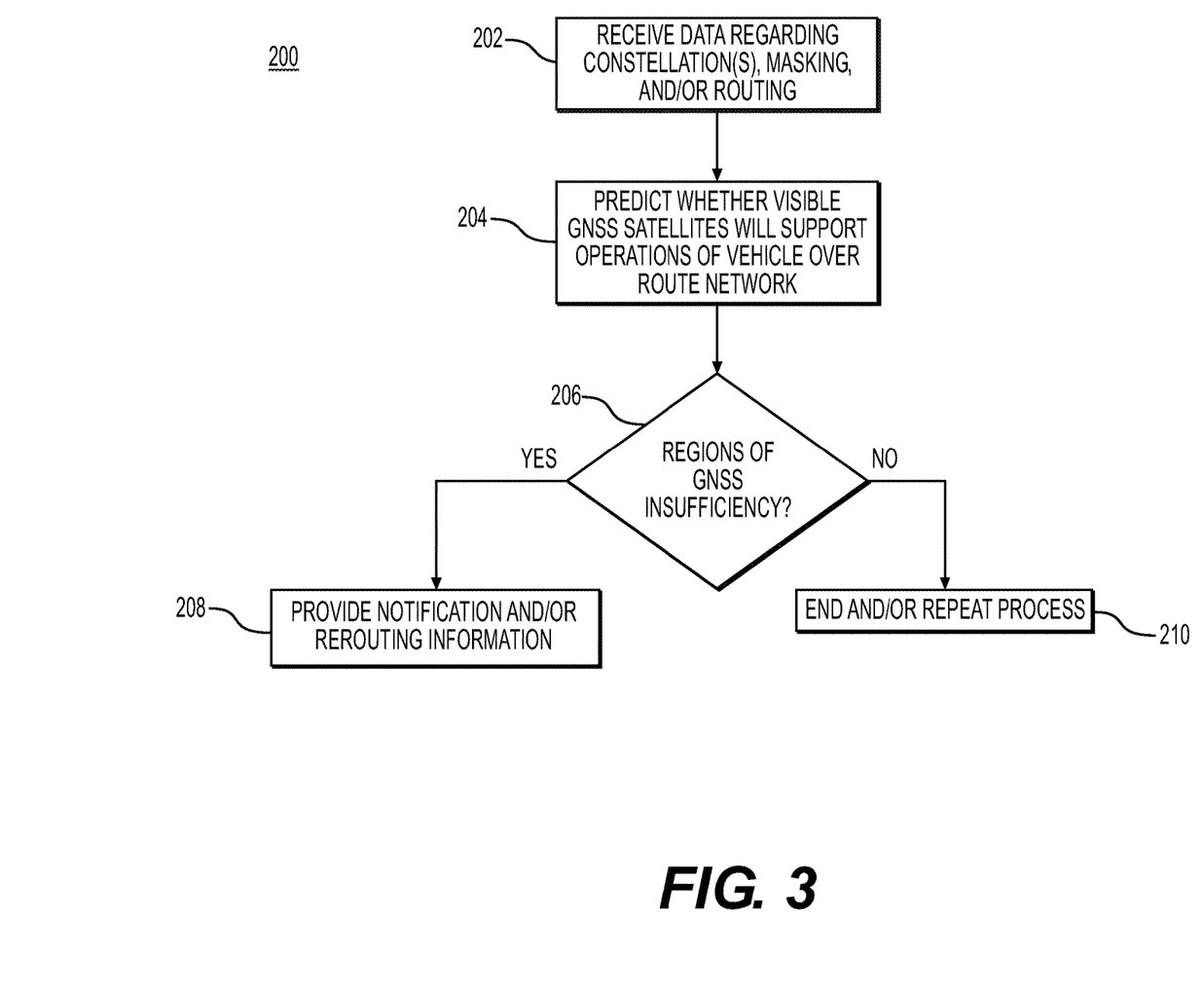

As shown in FIG. 3, GNSS loss of availability predictions may be used to identify areas along a route where UAM vehicle 72 is planning to travel via a method 200. In step 202, GNSS availability monitoring system 20 may receive information from, for example, database 50 and GNSS almanac 30. Constellation data from GNSS almanac 30 may be used, along with, for example, masking data from database 50 (e.g. GNSS masking database 56). Data from UAV/UAM route structure database 52 may also be used to identify geographic regions of interest for evaluating GNSS availability and/or potential rerouting options when a loss of GNSS availability is identified along one or more routes. In step 204, GNSS availability monitoring system 20 may use this data to predict if visible GNSS satellites will be sufficient to support the applicable UAV/UAM vehicle 72 operations. In case of a known, detected, or predicted outage of certain GNSS elements (or, e.g., an interference with GNSS elements), GNSS availability monitoring system 20 may determine in step 206 whether a remaining set of visible GNSS satellites will be sufficient to support a UAV/UAM vehicle operating in any geographic region within the UAV/UAM route structure defined by database 52. If the operations will not be supported, in step 208, a GNSS loss of availability notification may be communicated directly to UAV/UAM vehicle(s) 72 or to personnel via the GNSS availability display 60. Additionally or alternatively, system 10 may provide rerouting information (using, e.g., data from UAV/UAM route structure database 52) and/or automatically reroute UAV/UAM vehicle 72. Additionally or alternatively, in lieu of rerouting a UAV/UAM may elect to continue to route with the intent of operating under visual flight rules (VFR). If operations will be supported, then in step 210, method 200 may be terminated or restarted.

System 10 may also perform a combination of the above techniques. For example, a real-time GNSS interference detection (using, for example, method 100) may result in a loss of use of some but not all GNSS satellites within a constellation. Use of the analysis techniques for predicted GNSS availability (used, for example, in method 200) may result in detection of a loss of some but not all GNSS satellites within the constellation. By combining these two techniques (method 100 and method 200) additional losses of GNSS availability may be predicted that otherwise could not be detected using either technique individually. System 10 may, as above, provide a notification, rerouting information, or an automatic reroute. Additionally or alternatively, VFR operation may be applied.

Figure 4:
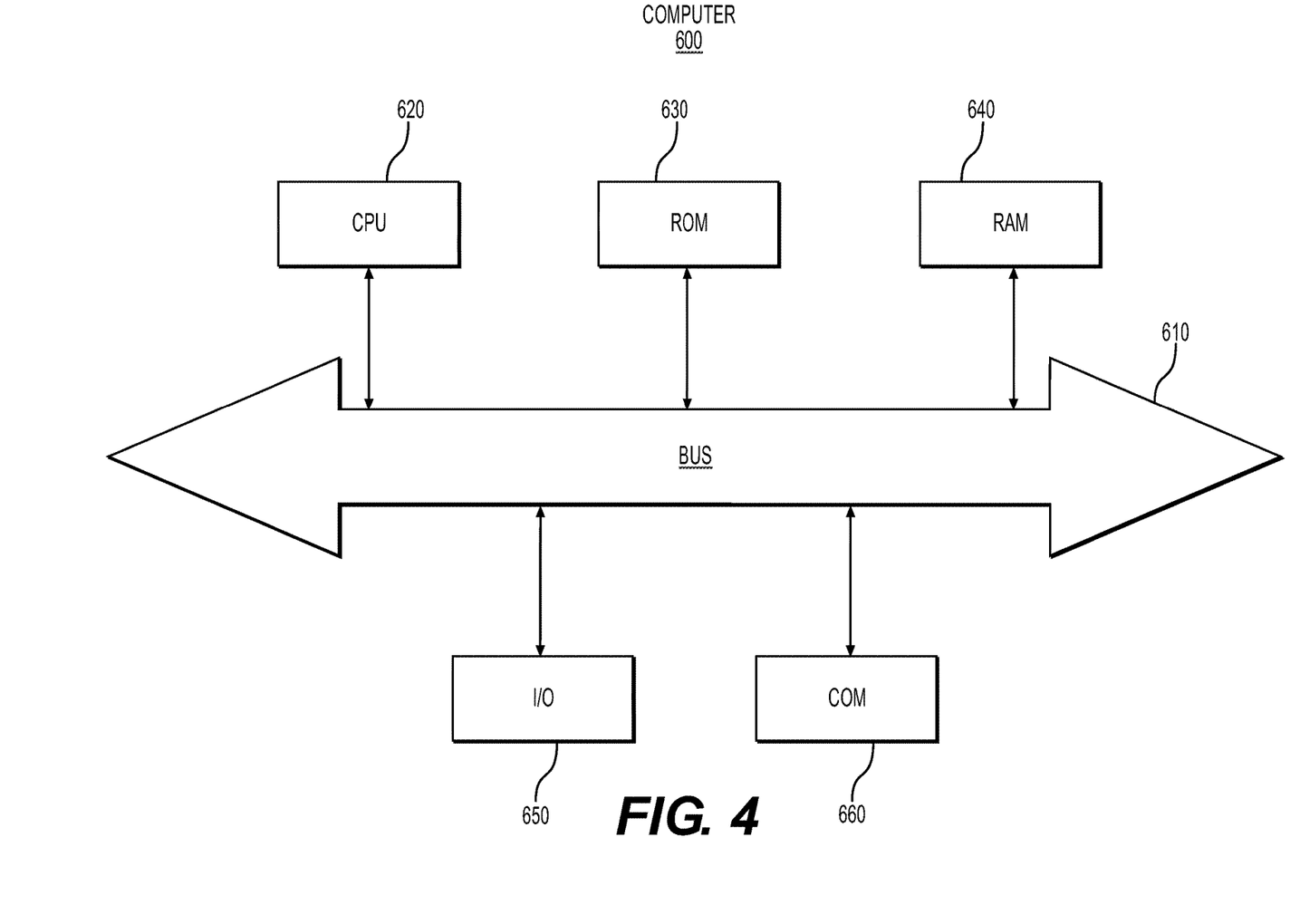
FIG. 4 depicts an exemplary computer device or system, in which embodiments of the present disclosure, or portions thereof, may be implemented.

FIG. 4 depicts a high-level functional block diagram of an exemplary computer device or system, in which embodiments of the present disclosure, or portions thereof, may be implemented, e.g., as computer-readable code. In some implementations, GNSS availability monitoring system 20 (depicted in FIG. 1) may correspond to device 600. Additionally, each of the exemplary computer servers, databases, user interfaces, modules, and methods described above with respect to FIGS. 1-3 can be implemented in device 600 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-3.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-3, may be implemented using device 600. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 4, device 600 may include a central processing unit (CPU) 620. CPU 620 may be any type of processor device including, for example, any type of special purpose or a general-purpose microprocessor device. As will be appreciated by persons skilled in the relevant art, CPU 620 also may be a single processor in a multi-core/multi-processor system, such system operating alone, or in a cluster of computing devices operating in a cluster or server farm. CPU 620 may be connected to a data communication infrastructure 610, for example, a bus, message queue, network, or multi-core message-passing scheme.

Device 600 also may include a main memory 640, for example, random access memory (RAM), and also may include a secondary memory 630. Secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 630 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 600.

Device 600 also may include a communications interface ("COM") 660. Communications interface 660 allows software and data to be transferred between device 600 and external devices. Communications interface 660 may include a modem, a network interface (such as an Ethernet card), a communications port, a PCMCIA slot and card, or the like. Software and data transferred via communications interface 660 may be in the form of signals, which may be electronic, electromagnetic, optical, or other signals capable of being received by communications interface 660. These signals may be provided to communications interface 660 via a communications path of device 600, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:
1. A computer-implemented method for analyzing Global Navigation Satellite System (GNSS) coverage, the method comprising:
    receiving data from at least one of a GNSS interference detector or a GNSS almanac;
    correlating the data received from the at least one of the GNSS interference detector or the GNSS almanac using data regarding a structure of a GNSS interference detector network;

receiving route data defining information regarding one or more known routes;

using the correlated data, determining whether a loss of availability of a relevant GNSS exists; and upon determining that the relevant GNSS loss of availability exists, performing at least one of providing rerouting information and automatically rerouting a vehicle, wherein the route data defining the information regarding the known routes is used to provide the rerouting information or automatically reroute the vehicle.

2. The method of claim 1, wherein the at least one of providing rerouting information and automatically rerouting the vehicle includes providing information to a datalink.

3. The method of claim 1,
wherein receiving the data from the at least one of the GNSS interference detector or the GNSS almanac includes receiving the data from the GNSS almanac, and wherein the correlating includes correlating the data received from the GNSS almanac, the method further including using at least one of the GNSS almanac or masking data to predict whether the relevant GNSS will experience a loss of availability.

4. The method of claim 1, wherein the receiving data from the at least one GNSS interference detector includes receiving data regarding a presence of a GNSS interference source.

5. The method of claim 4, wherein the receiving data from the at least one GNSS interference detector further includes receiving at least one of power or bearing information regarding a signal of the GNSS interference source.

6. A computer-implemented method for analyzing Global Navigation Satellite System (GNSS) coverage, the method comprising:

receiving GNSS almanac data and masking data regarding a visible GNSS network;

using the received GNSS almanac data and the received masking data, predicting whether the visible GNSS network will support operations of a vehicle within a geographic region defined by a route structure; and upon predicting that the visible GNSS network will not support the operations of the vehicle at a location within the geographic region, performing at least one of (a) providing a notification regarding a loss of availability, (b) providing rerouting information, (c) automatically rerouting the vehicle, (d) permitting operation in regions of GNSS loss of availability under visual flight rules, or (e) providing a notification of an area having a loss of availability.

7. The method of claim 6, further comprising receiving data from at least one GNSS interference detector, wherein the predicting includes using the received data from the at least one GNSS interference detector.

8. The method of claim 7, wherein the receiving data from the at least one GNSS interference detector includes receiving data regarding a presence of a GNSS interference source.

9. The method of claim 8, wherein the receiving data from the at least one GNSS interference detector includes receiving at least one of power or bearing information regarding a signal of the GNSS interference source.

10. The method of claim 6, further including providing information to a datalink.

11. The method of claim 6, further comprising receiving information regarding known routes, wherein the method includes providing rerouting information or automatically rerouting the vehicle, and wherein the information regarding the known routes is used to provide the rerouting information or automatically reroute the vehicle.

12. A system for analyzing Global Navigation Satellite System (GNSS) availability, the system comprising:

a source of almanac data;

a source of masking data; and a computer having a processor configured to:

receive GNSS almanac data and masking data regarding a visible GNSS network;

using the received GNSS almanac data and the received masking data, predict whether the visible GNSS network will support operations of a vehicle within a geographic region defined by a route structure; and upon predicting that the visible GNSS network will not support the operations of the vehicle at a location within the geographic region, perform at least one of (a) providing a notification regarding a loss of availability, (b) providing rerouting information, (c) automatically rerouting the vehicle, (d) permitting operation in regions of GNSS loss of availability under visual flight rules, or (e) providing a notification of an area having a loss of availability.

13. The system of claim 12, further comprising:

a plurality of GNSS interference detectors, wherein the processor is further configured to receive data from the plurality of GNSS interference detectors, and wherein the data from the GNSS interference detector is used to predict whether the visible GNSS network will support operations of the vehicle.

14. The system of claim 13, further comprising a source of data regarding a structure of a GNSS interference detector network, and wherein the processor is configured to correlate the data from the plurality of GNSS interference detectors with the data regarding the structure of the GNSS interference detector network.

15. The system of claim 12, further comprising a source of vehicle routing data, wherein the processor is configured to provide rerouting information or automatically rerouting the vehicle, and wherein the routing data is used to provide the rerouting information or automatically reroute the vehicle.

16. The system of claim 15, wherein the routing data includes emergency routing data.

17. The system of claim 12, further comprising a datalink, wherein the processor is configured to provide the notification regarding the GNSS loss of availability or provide the rerouting information, wherein the notification or the information is provided to the datalink.

18. The system of claim 17, wherein the datalink is in communication with the vehicle.

19. The system of claim 12, wherein the prediction is based in part on a planned route of the vehicle.

* * * * *